(12) United States Patent
Mizuguchi et al.

(10) Patent No.: US 6,373,881 B1
(45) Date of Patent: Apr. 16, 2002

(54) CDMA RECEIVER USING SAMPLED CHIP SEQUENCE FOR PRECISION SYNCHRONIZATION WITH RECEIVED DATA SEQUENCE

(75) Inventors: Hironori Mizuguchi; Shousei Yoshida; Akihisa Ushirokawa, all of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/126,461

(22) Filed: Jul. 30, 1998

(30) Foreign Application Priority Data

Jul. 30, 1997 (JP) .............................. 9-204134

(51) Int. Cl.[7] .............................................. H04L 27/30
(52) U.S. Cl. ...................... 375/147; 375/130; 375/136; 375/148; 375/152
(58) Field of Search ................................. 375/147, 136, 375/130, 152, 148, 234, 346; 370/342

(56) References Cited

U.S. PATENT DOCUMENTS

| | | | | |
|---|---|---|---|---|
| 5,377,226 A | * | 12/1994 | Davis | .......................... 370/342 |
| 5,646,964 A | | 7/1997 | Ushirokawa et al. | ....... 375/346 |
| 5,903,595 A | * | 5/1999 | Suzuki | ........................ 375/152 |
| 5,940,432 A | * | 8/1999 | Saito et al. | .................. 375/148 |
| 6,163,563 A | * | 12/2000 | Baker et al. | ................. 375/130 |

FOREIGN PATENT DOCUMENTS

JP          9-321734         12/1997

* cited by examiner

Primary Examiner—Stephen Chin
Assistant Examiner—Shuwang Liu
(74) Attorney, Agent, or Firm—Dickstein Shapiro Morin & Oshinsky LLP

(57) ABSTRACT

A CDMA communication receiver comprises a memory for storing chip samples representing amplitudes of a despreading chip sequence sampled at intervals smaller than chip intervals of the chip sequence. From the memory, sync search and tracking circuitry reads a set of chip samples spaced from each other by the chip intervals and spaced from corresponding chip samples of adjacent sets by the smaller intervals, and detects a match or mismatch between the read chip samples and the incoming data sequence. If they match, it is determined that the read chip samples is a synchronized chip sequence. Otherwise, a next set of chip samples is read from the memory for making a further test between the next set and the incoming data sequence. A despreading filter despreads the incoming data sequence with the synchronized chip sequence.

9 Claims, 4 Drawing Sheets

(N-DIMENSIONAL CODE VECTOR SPACE)

CDMA RECEIVER USING SAMPLED CHIP SEQUENCE FOR PRECISION SYNCHRONIZATION WITH RECEIVED DATA SEQUENCE

BACKGROUND OF THE INVENTION

1. Field of the Invention

The present invention relates generally to spread spectrum communication systems, and more particularly to soft-decision chip sequence timing detection of a code division multiple access (CDMA) communication receiver for synchronizing to a received spread data sequence.

2. Description of the Related Art

In a prior art CDMA receiver, a lowpass-filtered spread spectrum data sequence is over-sampled at intervals Tc/L to increase its timing information and stored in a buffer memory, where Tc is the chip intervals and L is an integer greater than unity. A set of data samples stored in locations spaced from each other by chip intervals Tc but spaced from corresponding data samples of adjacent sets by intervals Tc/L is successively read out of the memory for detecting a match or mismatch with the despreading chip sequence of the receiver. If they match, the read data samples are selected as a synchronized data sequence and despread with the chip sequence and other data samples over-sampled during the same chip interval are discarded. However, the amount of memory required for buffering the over-sampled data is substantial and a large processing delay is introduced. This long processing time is undesirable when signals are transmitted in bursts.

On the other hand, Japanese Laid-Open Patent Specification Hei-9-321734 discloses an interference canceller CDMA communication receiver using a tapped-delay line filter for cancelling undesired signals with orthogonal tap weight coefficients and detecting a desired signal on which threshold decision is made. To eliminate the otherwise required training sequence, the tap weight coefficients are updated with a decision error and the vector of the updated coefficients is constrained to a plane which is orthogonal to a vector of the chip sequence. However, the chip sequence must be precisely synchronized to the received data sequence.

SUMMARY OF THE INVENTION

It is therefore an object of the present invention to provide a CDMA communication receiver which performs soft-decision chip sequence timing detection in a short processing time using a small memory.

According to a first aspect of the present invention, there is provided a CDMA communication receiver comprising a memory for storing chip samples representing amplitudes of a chip sequence sampled at intervals smaller than chip intervals of the chip sequence. Sync search and tracking circuitry is provided for reading, from the memory, a set of chip samples spaced from each other by the chip intervals and spaced from corresponding chip samples of adjacent sets by the smaller intervals, and detecting a match or mismatch between the read chip samples and an incoming data sequence. If they match, it is determined that the read chip samples is a synchronized chip sequence. Otherwise, a next set of chip samples is read from the memory for making a further test between the next set and the incoming data sequence. A despreading filter despreads the incoming data sequence with the synchronized chip sequence.

According to a second aspect of the present invention, there is provided a CDMA communication receiver comprising a memory for storing chip samples representing amplitudes of a chip sequence sampled at intervals smaller than chip intervals of the chip sequence and sync search and tracking circuitry for reading, from the memory, a set of chip samples spaced from each other by the chip intervals and spaced from corresponding chip samples of adjacent sets by the smaller intervals, and detecting a match or mismatch between the read chip samples and an incoming data sequence. If they match, the read chip samples is determined as a synchronized chip sequence. Otherwise, a next set of chip samples is read from the memory for making a further test between the next set and the incoming data sequence. A tapped-delay line filter is provided for operating tap weight coefficients on the incoming data sequence and detecting therefrom a desired signal. A threshold decision circuit performs a threshold decision on the detected desired signal and a decision error of the threshold decision circuit is detected. Tap weight update circuitry updates the tap weight coefficients with the decision error. Tap weight constraining circuitry uses the synchronized chip sequence for constraining a vector of the updated tap weight coefficients to a plane orthogonal to a vector of the synchronized chip sequence and supplies the constrained vector to the tapped-delay line filter as the tap weight coefficients.

According to a third aspect, the present invention provides a method of detecting synchronization between a spread data sequence and a despreading chip sequence, comprising the steps of (a) storing, in a memory, chip samples representing amplitudes of the chip sequence sampled at intervals smaller than chip intervals of the chip sequence, (b) reading, from the memory, a set of chip samples spaced from each other by the chip intervals and spaced from corresponding chip samples of adjacent sets by the smaller intervals, (c) detecting a match or a mismatch between the read chip samples and an incoming spread spectrum data sequence, and (d) despreading the data sequence with the read chip samples if there is a match between the read chip samples and the data sequence. The steps (b) and (c) are repeated on a next set of chip samples of the memory if they mismatch.

According to a fourth aspect, the present invention provides a method of detecting synchronization between a spread data sequence and a despreading chip sequence, comprising the steps of (a) storing, in a memory, chip samples representing amplitudes of the chip sequence sampled at intervals smaller than chip intervals of the chip sequence, (b) reading, from the memory, a set of chip samples spaced from each other by the chip intervals and spaced from corresponding chip samples of adjacent sets by the smaller intervals, (c) detecting a match or a mismatch between the read chip samples and an incoming spread spectrum data sequence, (d) determining the read chip samples as a synchronized chip sequence if they match, and repeating the steps (b) and (c) on a next set of chip samples of the memory if they mismatch, (e) supplying a vector of tap weight coefficients to a tapped-delay line filter and operating the vector on the incoming data sequence to cancel interference signals and detect a desired signal, (f) making a threshold decision on the desired signal, (g) detecting a decision error of the step (f), (h) updating the tap weight coefficients with the decision error, and (i) constraining a vector of the updated tap weight coefficients to a plane orthogonal to a vector of the synchronized chip sequence, and repeating the steps (e) to (h) by using the constrained vector as the tap weight coefficients.

BRIEF DESCRIPTION OF THE DRAWINGS

The present invention will be described in further detail with reference to the accompanying drawings, in which.

DETAILED DESCRIPTION

Figure 1:
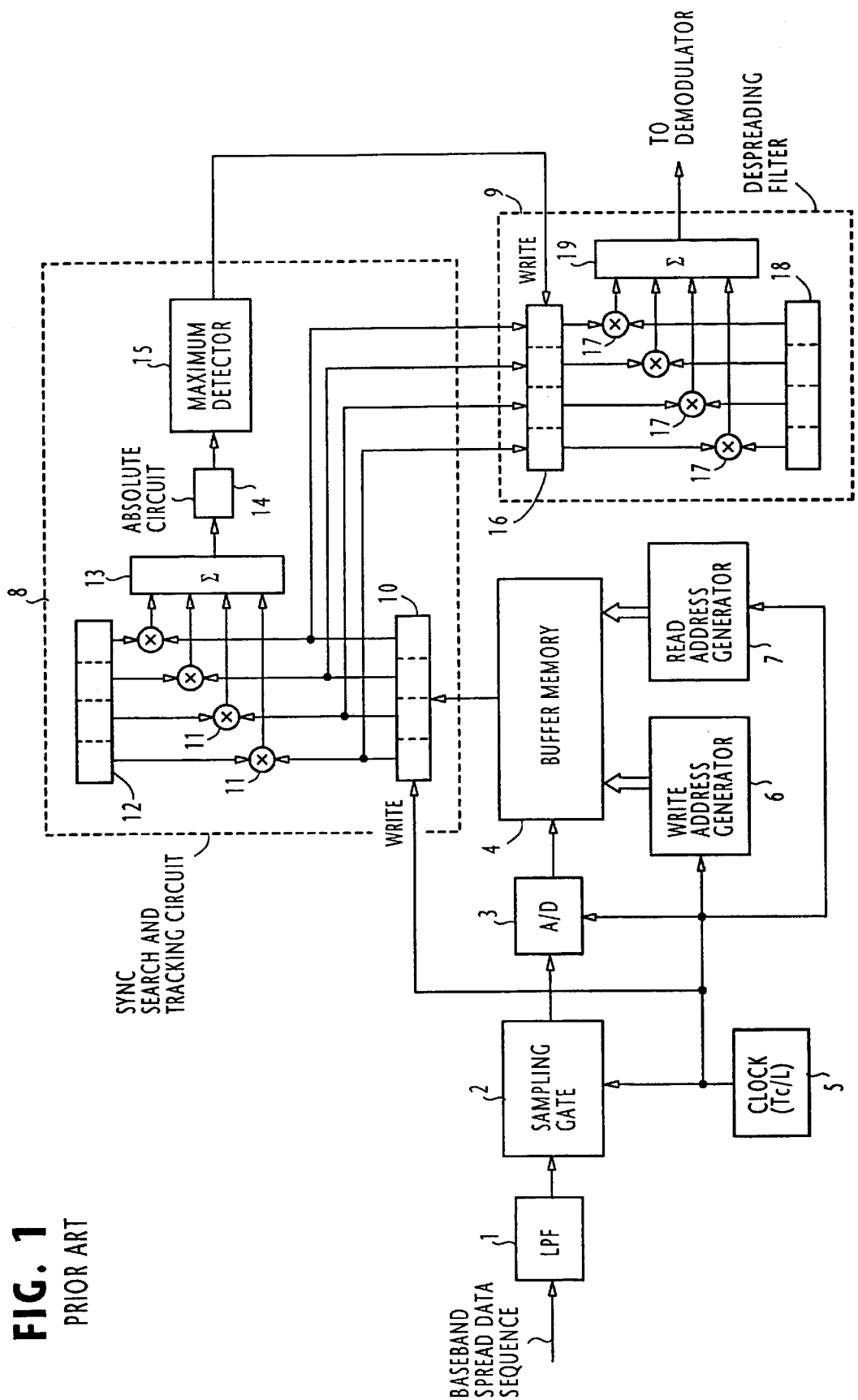
FIG. 1 is a block diagram of a prior art CDMA receiver.

Before proceeding with the detailed description of the present invention, it may prove helpful to provide an explanation of the prior art with reference to the block diagram shown in FIG. 1. A baseband spread spectrum signal is applied through an anti-aliasing lowpass filter 1 to a sampling gate 2 where the input signal is over-sampled at intervals Tc/L in response to a sampling clock pulse from clock source 5, where Tc is the chip interval at which the signal was spread at the transmitter and L is an integer greater than unity. The amplitude value of each data sample is converted to a digital value. Since the spread spectrum signal is a chip sequence (spreading code) for a symbol bit "0" and a complement of the chip sequence for a symbol bit "1", the digital signal from the A/D converter 3 represents an interpolation of the baseband signal. The over-sampled data sequence is, therefore, enriched with information useful for detection of sync timing.

The output of A/D converter 3 is stored column-by-column into a buffer memory 4 by a write address generator 6. A set of stored data samples is read row-by-row from the buffer memory 4 at intervals Tc/L in response to a read address supplied from a read address generator 7, so that data samples of each set are spaced a time interval Tc from each other and spaced a time interval Tc/L from corresponding data samples of adjacent sets.

A sync search and tracking circuit 8 is provided for making a search through the buffer memory for an optimum set of data samples. Sync search and tracking circuit 8 includes a latch 10 which is loaded with a set of data samples read from the buffer memory at intervals Tc/L. The loaded data samples are multiplied in multipliers 11 with respective bits of a despreading code stored in a register 12. The multiplied values are summed by an adder 13. Since there are bit reversals in the chip sequence of the received baseband signal depending on the original symbol, the absolute value of the output of the adder 13 is taken by an absolute-value circuit 14 and supplied to a maximum detector 15, which determines whether it is a maximum value or not. Since data samples are continuously read out of the buffer memory 4 into the latch 10 at intervals Tc/L, the maximum detector 15 will determine a set of optimum data samples as a synchronized data sequence when they exactly match the chip sequence stored in the register 12. When this occurs, the maximum detector 15 supplies a write command signal to a despreading filter 9, and other data samples over-sampled during the same chip interval as the synchronized data sample are discarded.

Despreading filter 9 has a latch 16 which responds to the write command signal from the sync search and tracking circuit for latching the data samples from the latch 10. The latched data samples are multiplied in multipliers 17 by respective bits of a chip sequence stored in a register 18, this chip sequence being the same as that stored in the register 12. The outputs of the multipliers 17 are summed in an adder 19 and supplied to a digital demodulator, not shown, which is followed by a threshold decision device.

Sync search and tracking circuit 8 continues its operation on successively stored data samples in the latch 10, while the sequence latched in the latch 16 remains until the next optimum data samples are detected.

However, the amount of memory required for buffering the sampled data is substantial. In addition, a large processing delay is introduced. This long processing time is undesirable when signals are transmitted in bursts.

The present invention overcomes the prior art shortcomings by sampling the chip sequence of a CDMA receiver and storing the sampled values in a memory. Once the sampled values are stored, they are retained in the memory and repeatedly used.

Figure 2:
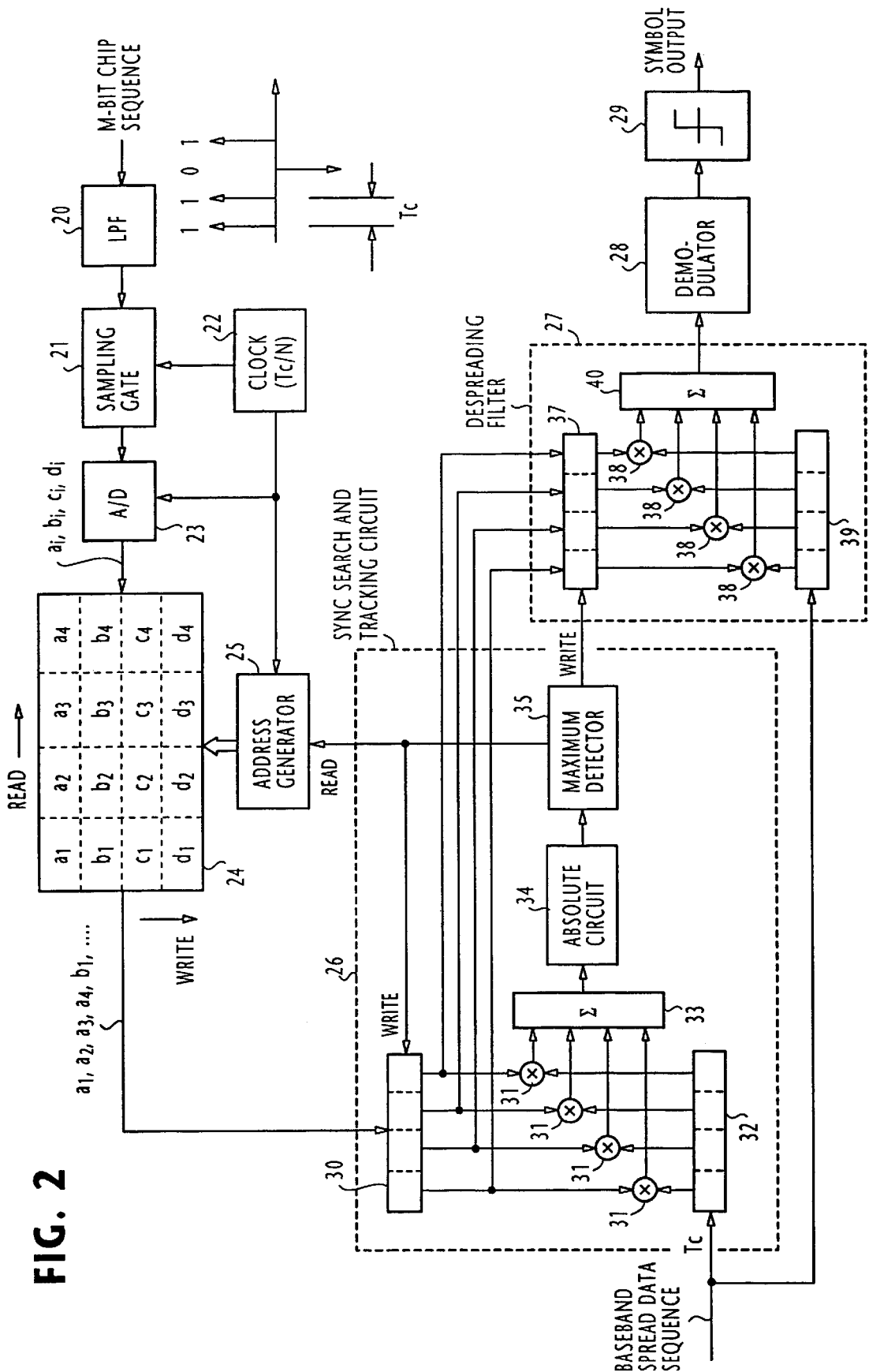
FIG. 2 is a block diagram of a CDMA receiver according to a first embodiment of the present invention.

In FIG. 2, an M-bit chip sequence is passed through an anti-aliasing lowpass filter 20 to a sampling gate 31 where the chip sequence is sampled at intervals Tc/N, where N is an integer greater than unity. The analog value of the chip samples is converted to a digital value in an A/D converter 23 and stored column-by-column in a memory 24.

Figure 3:
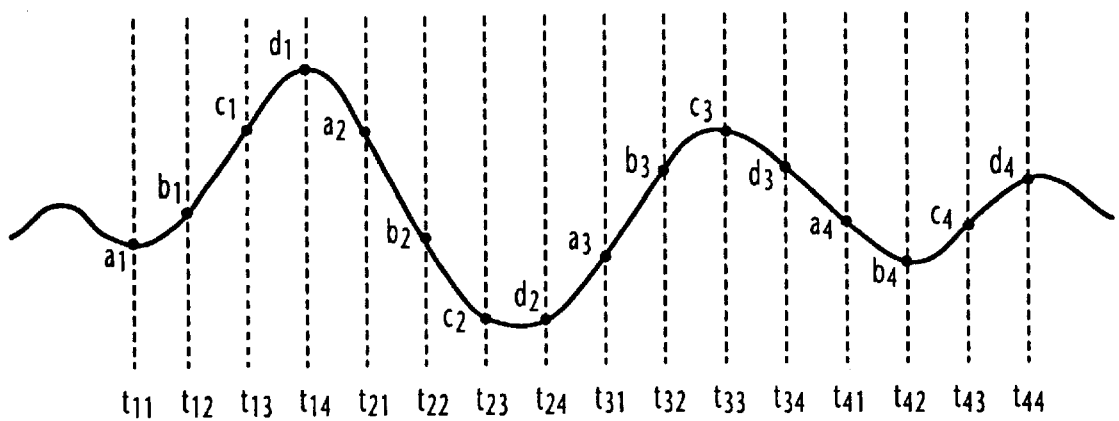
FIG. 3 is a waveform diagram showing sampled values.

If the chip sequence is a series of bits "1101", it is represented by a series of voltages 1, 1, −1, 1 occurring at chip intervals Tc. When this sequence is passed through the lowpass filter 20, the waveform is so shaped that no foldover distortion occurs in the sampled sequence as shown in FIG. 3. If the integer N is 4, this waveform will be sampled four times with the chip interval Tc, producing analog samples $a_i$, $b_i$, $c_i$ and $d_i$ at sampling instants $t_{ij}$ where i=1, 2, ..., M and j=1, 2, ..., 4. Digital samples corresponding to analog samples $a_i$, $b_i$, $c_i$ and $d_i$ are stored columnwise in the memory 24 as shown in FIG. 2. In this way, the sampled chip sequence is enriched with information useful for detecting precision sync timing with the incoming data sequence. An address generator 25 produces write addresses specifying storage locations arranged columnwise in the memory 24.

Address generator 25 operates in a read mode under control of a sync search and tracking circuit 26 and reads a parallel set of digital samples row-by-row from the memory 24 at intervals Tc/N. Sync search and tracking circuit 26 includes a latch 30 for storing the parallel data from the memory 24. Incoming baseband spread data sequence is stored into a shift register 32, shifted along this register at intervals Tc, and the individual bits of the received sequence are multiplied in multipliers 31 with the chip samples stored in the latch 30. The outputs of the multipliers 31 are summed in an adder 33 and applied to an absolute-value circuit 34 where the absolute value of the sum is determined. A maximum detector 35, connected to the output of absolute-value circuit 34, examines the absolute value of the sum and determines whether it corresponds to a predetermined maximum value. If it is determined that it fails to correspond to the maximum value, the maximum detector 35 supplies a read command signal to the address generator 25 and a write command signal to the latch 30 to read a set of chip samples out of the next row of the memory 24 into the latch 30, while the input data sequence is still in the shift register 32. As long as a non-maximum value is detected, the maximum detector 35 repeats the read operation on successive rows of the memory 24 so that a maximum of four sets of stored row data ($a_1$, $a_2$, $a_3$, $a_4$), ($b_1$, $b_2$, $b_3$, $b_4$), ($c_1$, $c_2$, $c_3$, $c_4$) and ($d_1$, $d_2$, $d_3$, $d_4$) will be retrieved from the memory and checked against the incoming data sequence of the shift register 32.

It is seen therefore that the sync search and tracking circuit 26 reads a set of samples which are spaced from each other by the chip intervals Tc and spaced from corresponding samples of adjacent sets by the intervals Tc/N, detects a match or mismatch between the read samples and the incoming data sequence, determines the read samples as a synchronized chip sequence if there is a match between the read samples and the incoming data sequence, and reads a next set of samples from the memory if they mismatch to extend its search to the next precision timing instant.

If the chip samples of the latch 30 exactly match the data sequence in the shift regiser 32, the maximum detector 35 determines that the absolute value of the sum corresonds to the maximum value and supplies a write command signal to a despreading filter 27 to which the incoming data sequence is also supplied.

Despreading filter 27 comprises a latch 37 which responds to the write command from the maximum detector 35 for latching the parallel chip samples stored in the latch 30. The incoming data sequence is stored in a shift register 39 at the same time as it is stored into the shift register 32. The chip samples in the latch 37 are multiplied in multipliers 38 with the input data sequence in the shift register 39 and the outputs of the multipliers 38 are summed in an adder 40. A digital demodulator 28 performs a digital demodulation process on the output of the adder 40. Digital demodulator 28 is followed by a threshold decision device 29 which produces a symbol output by comparing the output of the demodulator with a decision threshold level.

Figure 4:
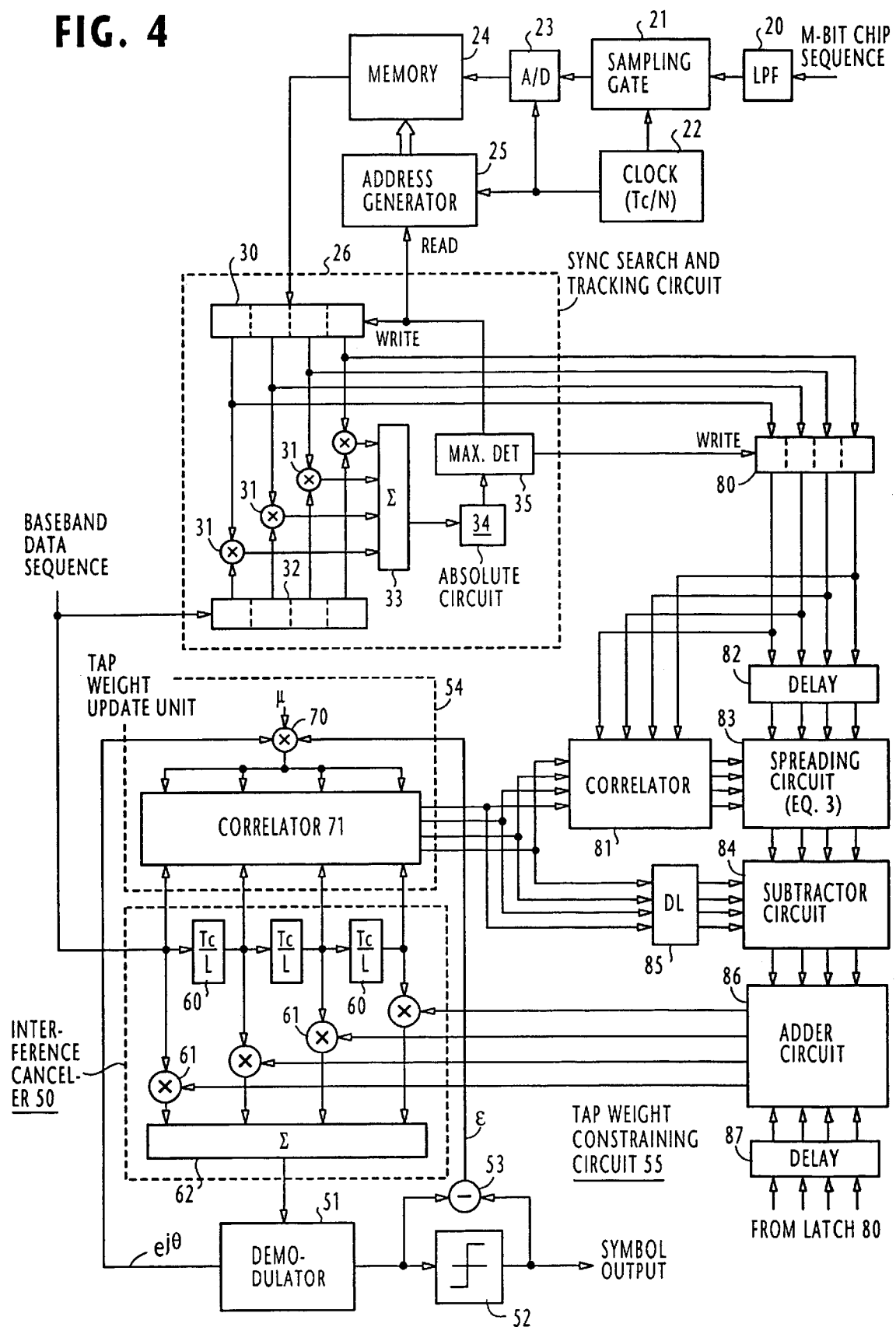
FIG. 4 is a block diagram of a CDMA receiver according to a second embodiment of the present invention.

A second embodiment of this invention is shown in FIG. 4 in which parts corresponding in significance to those of FIG. 2 are marked with the same numerals as those used in FIG. 2 and the description thereof is omitted. Instead of the despreading filter 27 of FIG. 2, this embodiment comprises an interference canceller 50, a tap weight update circuit 54 and a tap weight constraining circuit 55.

Interference canceller 50 is a tapped-delay line filter comprising a series of delay elements 60, a plurality of tap-weight multipliers 61 connected to successive taps of the delay line, and an adder 62 for summing the outputs of the multipliers 61. Each delay element 60 introduces a unit delay time Tc/L, where L is an integer greater than unity. The incoming baseband data sequence is applied to the tapped-delay line to produce tap signals successively delayed at intervals Tc/L. Tap weight coefficients are supplied to the multipliers 61 from the tap weight constraining circuit 55. These coefficients are elements of a code vector orthogonal to incoming code vectors at the tapped delay line except for the chip sequence of the CDMA receiver. The tap weight coefficients are adaptively controlled so that their vector functions as the despreading chip sequence of the CDMA receiver, while cancelling interference from multipath fading channels.

The output of the adder 62 is supplied to a digital demodulator 51. As described in U.S. Pat. No. 5,646,964, tilted "DS/CDMA Receiver for High-Speed Fading Environment", issued to Akihisa Ushirokawa et al, the digital demodulator 51 comprises an automatic gain controlled amplifier whose output is delayed by a symbol interval and applied to a normalizer where the amplitude of the symbol-delayed signal is normalized. A complex value of the normalized signal is produced and multiplied with the output of the automatic gain controlled amplifier. At time (i+1), the delayed signal and the amplifier output have phase angles $\theta_i = \phi_i + \varphi_i$ and $\theta_{i+1} = \phi_{i+1} + \varphi_{i+1}$, respectively, where $\phi_i$ is the phase angle of the transmit signal at time instant i, and $\varphi_i$ is a carrier phase component at time i attributed by the transmission channel. Since the output of the gain controlled amplifier is given by a phase angle $\theta_{i+1}$, the multiplied amplifier output represents the phase difference $\theta_{i+1} - \theta_i$. If the phase component $\varphi_i$ of a transmission channel is approximately equal to the phase component $\theta_{i+1}$ at time instant (i+1), the phase difference $\theta_{i+1} - \theta_i$ does not contain carrier phase component and corresponds to a phase variation of the transmitted signal and the phase variation of the carrier is cancelled. Digital demodulator 51 produces a phase rotation vector $e^{j\theta}$ from the delayed and normalized output of the gain controlled amplifier and supplies a demodulated signal to a threshold decision device 52. A decision error detector 53 is connected across the input and output terminals of the threshold decision device 52 to detect a decision error and produce a decision error signal $\epsilon(i)$.

The tap weight coefficients are updated by the tap weight update unit 54 according to the MMSE (minimum mean square error) algorithm. Tap weight update unit 54 includes a multiplier 70 that multiplies the decision error $\epsilon(i)$ with the phase rotation vector $e^{j\theta}$ and a stepsize value $\mu$ to produce an update coefficient. Correlations between complex-conjugate of the tap signals $r^*(i)$ and the update coefficient $\mu\epsilon(i) e^{j\theta}$ are taken by a correlator 71. For each tap weight coefficient "k", the correlator 71 solves the relation $c_k(i+1) = c_k(i) + \mu\epsilon(i) e^{j\theta} r_k^*(i)$. In this way, the tap weight coefficients are updated and their vectors are oriented in a direction orthogonal to those of the undesired components of the received signal and aligned with the output vector of the adder 62.

The purpose of the tap weight constraining circuit 55 is to converge the tap weight coefficient by restricting the tap weight vector c(i+1) to a constraint plane which is orthogonal to the synchronized code chip vector $c_0$. The power of the desired signal at the output of the interference canceller 50 can be maintained constant. Advantageously, this technique avoids the use of a training sequence.

Figure 5:
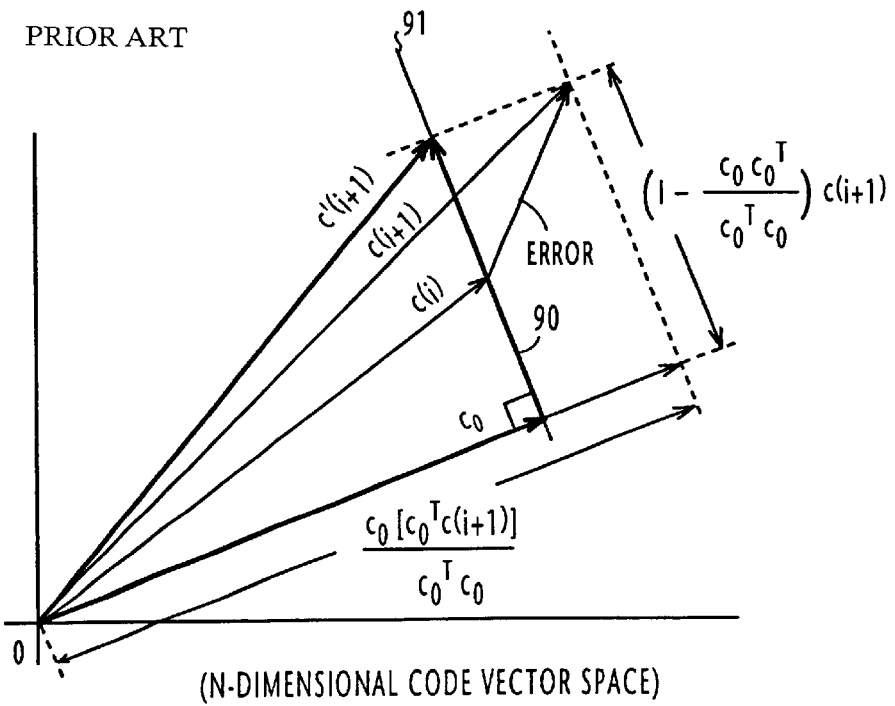
FIG. 5 is a graphic representation of an N-dimensional code vector space for explaining the code vectors of the tap weight coefficient constraining circuit of FIG. 4.

As shown in FIG. 5, a code vector 90 that is orthogonal on a constraint plane 91 to the code vector $c_0$ is represented as follows:

$$\left(I - \frac{c_0 c_0^T}{c_0^T c_0}\right) c(i+1) \quad (1)$$

where I is a unit matrix and $c_0^T$ is a transpose of chip code matrix $c_0$. According to the constraining process, the tap weight vector c(i+1) is converted to a code vector c'(i+1) which is a vector sum of the form:

$$c'(i+1) = \left(I - \frac{c_0 c_0^T}{c_0^T c_0}\right) c(i+1) + c_0 \quad (2)$$

Since the correlation between the code vector 90 and the desired signal is zero, the power of a desired signal which would be obtained by the code vector c'(i+1) is always equal to the power of a desired signal obtained by the code vector $c_0$. From FIG. 5 it is seen that the code vector 90 is obtained by subtracting the following vector (which is aligned with the code vector $c_0$) from the code vector c(i+1):

$$\frac{c_0 [c_0^T c(i+1)]}{c_0^T c_0} \quad (3)$$

This code vector is, in turn, obtained by determining a correlation vector between the code vectors c(i+1) and $c_0$, normalizing the correlation vector with the power of the code vector $c_0$, and spreading the normalized vector with the chip code vector $c_0$. The code vector c'(i+1) is finally obtained by summing the code vector $c_0$ to the spread code vector.

The constraining process is implemented as follows. The parallel chip code synchronized to the desired signal is supplied from the sync search and tracking circuit 26 and stored into a latch 80 as a chip code vector $c_0$. The stored chip code is applied to a correlator 81 in which a correlation is taken between it and a tap weight code vector $c(i+1)$ obtained at the outputs of correlator 71 to produce a correlation vector which is then normalized by the power of code vector $c_0$. The chip code vector $c_0$ of latch 80 is also delayed by a delay circuit 82 by an amount corresponding to the processing time of the correlator 81. The delayed chip code is used to spread the normalized correlation vector in a multiplying, spreading circuit 83. The outputs of the spreading circuit 83 thus represent the code vector of Equation (3).

The tap weight code vector $c(i+1)$ is also delayed by a delay circuit 85 so that it coincides in time with the outputs of the spreading circuit 83. The spread code vector from the spreading circuit 83 is supplied to a subtractor circuit 84 where it is subtracted from the time-coincident code vector $c(i+1)$. The outputs of subtractor circuit 84 thus represent the code vector 90.

An adder circuit 86 is provided for summing the outputs of the subtractor circuit 84 with the chip code vector $c_0$ which is delayed by a delay circuit 87 so that it coincides in time with the outputs of the subtractor circuit 84. The outputs of the adder circuit 86 are the constrained code vector $c'(i+1)$, whose elements are respectively applied to the multipliers 61 of the interference canceller 50 as orthogonal tap weight coefficients.

What is claimed is:

1. A code division multiple access communication receiver comprising:

a memory for storing samples representing amplitudes of a chip sequence sampled at intervals smaller than chip intervals of the chip sequence;

sync search and tracking circuitry for reading, from said memory, a set of chip samples spaced from each other by said chip intervals and spaced from corresponding chip samples of adjacent sets by said smaller intervals, detecting a match or mismatch between the read samples and an incoming data sequence, and determining the read chip samples as a synchronized chip sequence if said match is detected, and reading a next set of chip samples from said memory if said mismatch is detected, and further detecting a match or a mismatch between the chip samples of the next set and said incoming data sequence; and a despreading filter for despreading the incoming data sequence with said synchronized chip sequence.

2. A code division multiple access communication receiver as claimed in claim 1, further comprising:

an anti-aliasing filter for lowpass-filtering said chip sequence;

a sampling circuit for sampling the lowpass-filtered chip sequence at intervals smaller than said chip intervals and producing said chip samples; and an address generator for writing said chip samples into each one of a plurality of columns of said memory and reading a set of chip samples from one of a plurality of rows of the memory in response to said mismatch detected by said sync search and tracking circuitry.

3. A code division multiple access communication receiver as claimed in claim 1, further comprising a demodulator for processing an output signal of said despreading filter and a threshold decision circuit for receiving an output signal from the demodulator.

4. A code division multiple access communication receiver comprising:

a memory for storing chip samples representing amplitudes of a chip sequence sampled at intervals smaller than chip intervals of the chip sequence;

sync search and tracking circuitry for reading, from said memory, a set of chip samples spaced from each other by said chip intervals and spaced from corresponding chip samples of adjacent sets by said smaller intervals, detecting a match or mismatch between the read chip samples and an incoming data sequence, determining the read chip samples as a synchronized chip sequence if said match is detected, and reading a next set of chip samples from said memory if said mismatch is detected, and further detecting a match or a mismatch between the chip samples of the next set and said incoming data sequence;

a tapped-delay line filter for operating tap weight coefficients on the incoming data sequence and detecting therefrom a desired signal;

a threshold decision circuit for making a threshold decision on the detected desired signal;

an error detector for detecting a decision error of said threshold decision circuit;

tap weight update circuitry for updating said tap weight coefficients with the decision error; and tap weight constraining circuitry for constraining a vector of the updated tap weight coefficients to a plane orthogonal to a vector of said synchronized chip sequence and supplying the constrained vector to the tapped-delay line filter as said tap weight coefficients.

5. A code division multiple access communication receiver as claimed in claim 4, further comprising:

an anti-aliasing filter for lowpass-filtering said chip sequence;

a sampling circuit for sampling the lowpass-filtered chip sequence at intervals smaller than said chip intervals and producing said chip samples; and an address generator for writing said chip samples into each one of a plurality of columns of said memory and reading a set of chip samples from one of a plurality of rows of the memory in response to said mismatch detected by said sync search and tracking circuitry.

6. A code division multiple access communication receiver as claimed in claim 4, further comprising a demodulator connected to said tapped-delay line filter for producing a phase rotation vector from the desired signal detected by the tapped-delay line filter, said tap weight update circuitry additionally updating the tap weight coefficients with said phase rotation vector.

7. A code division multiple access communication receiver as claimed in claim 4, wherein said tap weight constraining circuitry comprises:

correlation circuitry for detecting a correlation between said synchronized chip sequence and an output vector of said tap weight update circuitry;

multiplying circuitry for multiplying an output vector of said correlation circuitry with said synchronized chip sequence;

subtracting circuitry for subtracting an output vector of said multiplying circuitry from the output vector of said tap weight update circuitry; and adder circuitry for summing the synchronized chip sequence to an output vector of said subtracting circuitry to produce said tap weight coefficients.

8. A method of detecting synchronization between a spread data sequence and a despreading chip sequence, comprising the steps of:
   a) storing, in a memory, chip samples representing amplitudes of the chip sequence sampled at intervals smaller than chip intervals of the chip sequence;
   b) reading, from said memory, a set of chip samples spaced from each other by said chip intervals and spaced from corresponding chip samples of adjacent sets by said smaller intervals;
   c) detecting a match or a mismatch between the read chip samples and an incoming spread spectrum data sequence; and
   d) despreading the data sequence with the read chip samples if said match is detected, and repeating the steps (b) and (c) on a next set of chip samples of the memory if said mismatch is detected.

9. A method of detecting synchronization between a spread data sequence and a despreading chip sequence, comprising the steps of:
   a) storing, in a memory, chip samples representing amplitudes of the chip sequence sampled at intervals smaller than chip intervals of the chip sequence;
   b) reading, from said memory, a set of chip samples spaced from each other by said chip intervals and spaced from corresponding chip samples of adjacent sets by said smaller intervals;
   c) detecting a match or a mismatch between the read chip samples and an incoming spread spectrum data sequence;
   d) determining the read chip samples as a synchronized chip sequence if said match is detected, and repeating the steps (b) and (c) on a next set of chip samples of the memory if said mismatch is detected;
   e) supplying a vector of tap weight coefficients to a tapped-delay line filter and operating the vector on said incoming data sequence to cancel interference signals and detect a desired signal;
   f) making a threshold decision on the desired signal;
   g) detecting a decision error of the step (f);
   h) updating the tap weight coefficients with the decision error; and
   i) constraining a vector of the updated tap weight coefficients to a plane orthogonal to a vector of the synchronized chip sequence and repeating the steps (e) to (h) by using the constrained vector as said tap weight coefficients.

* * * * *